United States Patent

Nelson

[11] Patent Number: 6,053,055
[45] Date of Patent: *Apr. 25, 2000

[54] MULTI-PORT ORIFICE METER FITTING

[76] Inventor: Lloyd E. Nelson, No. 10. 15 9th Street NE., Medicine Hat, Alberta, Canada, T2A 8G2

[*] Notice: This patent issued on a continued prosecution application filed under 37 CFR 1.53(d), and is subject to the twenty year patent term provisions of 35 U.S.C. 154(a)(2).

[21] Appl. No.: 08/902,525

[22] Filed: Jul. 29, 1997

[51] Int. Cl.[7] ............................. G01F 1/37; F16K 25/00
[52] U.S. Cl. ............................ 73/861.52; 251/205
[58] Field of Search ..................... 73/861.42, 861.52, 73/861.58, 861.61, 861.64; 251/205, 206

[56] References Cited

U.S. PATENT DOCUMENTS

| 2,626,820 | 1/1953 | Dons et al. | 73/861.61 |
| 4,422,339 | 12/1983 | Gall et al. | 73/861.61 |
| 4,909,476 | 3/1990 | Messick | 251/206 |

FOREIGN PATENT DOCUMENTS 0179220  8/1991  Japan ............................. 73/861.52

*Primary Examiner*—Harshad Patel
*Attorney, Agent, or Firm*—Adrian Battison; Murray E. Thrift

[57] ABSTRACT

An orifice meter comprised of two concentric flanges and a center plate assembly is described. The center plate assembly includes an orifice plate holder arranged to rotate within the orifice meter around a shaft extending from the center of the center plate assembly and protruding through one of the flanges. Rotating the shaft will align one of the orifice plates in the orifice plate holder with the inlet and outlet pipe openings in the flanges. Thus, the orifice meter herein described does not have to be disconnected to change orifice plates. Pressure transducers are included in the flanges to determine the pressure upstream and downstream of the orifice plate. An inspection plug installed in one of the flanges allows for easy inspection and changing of the orifice plates, meaning that the orifice meter herein described does not have to be disconnected to replace or service the orifice plates.

10 Claims, 1 Drawing Sheet

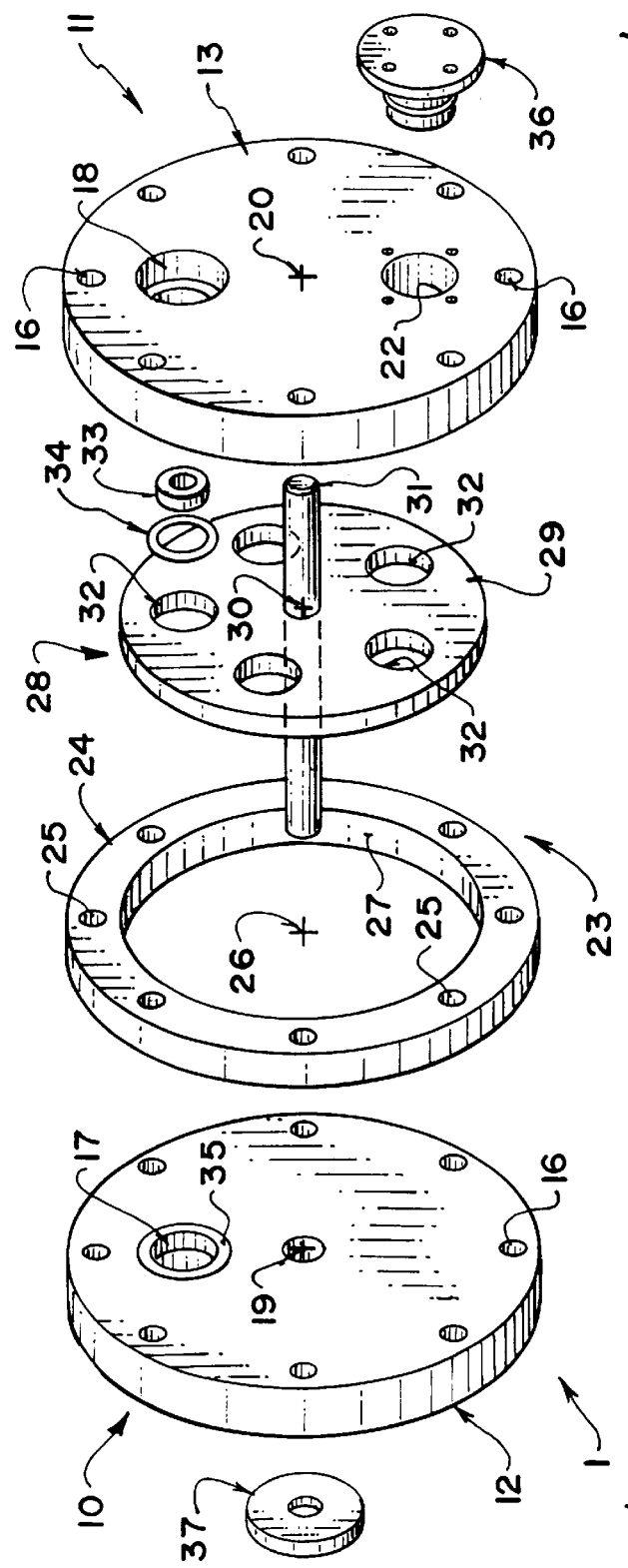
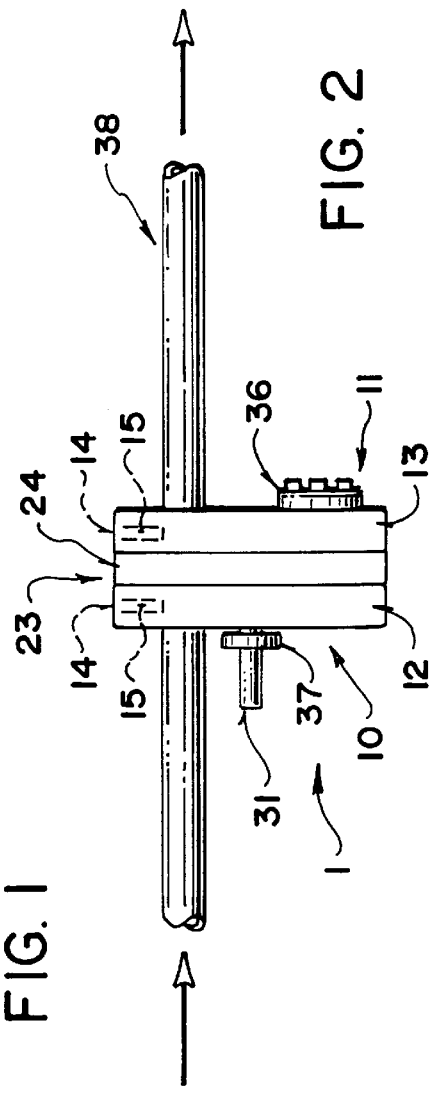

MULTI-PORT ORIFICE METER FITTING

FIELD OF THE INVENTION

The present invention relates generally to orifice meters and more specifically to a multi-port orifice meter.

BACKGROUND OF THE INVENTION

It is often desirable to calculate the flow rate of a fluid traveling through a pipe. The method commonly used to determine the flow rate involves increasing the velocity of flow by causing the fluid to flow through a constriction. This results in an increase in the kinetic energy of flow accompanied by a corresponding drop in pressure at the constriction. The actual rate of flow can then be calculated by measuring the pressure before and after the constriction and applying the proper equations.

Of the devices used to determine flow rates, orifice meters have the simplest design, generally comprising an orifice plate which has a circular hole concentric with the pipe clamped between two pipe flanges. However, one circular hole may not be able to measure the flow rate in all cases. In order to get an accurate measurement in this instance, the flow of the fluid in the pipe must be stopped, the orifice plate removed and a new orifice plate having a circular hole of a different diameter inserted. Not only is this process cumbersome and time consuming, there is also considerable risk of injury to the operator who may inadvertently contact residual fluid in the pipes, which may be toxic, during the process of changing orifice plates. The present invention overcomes this deficiency by providing means for changing orifice plates without having to loosen or remove any part of the fitting.

SUMMARY OF THE INVENTION

According to a first aspect of the invention, there is provided an orifice meter comprising:

- a body comprising a chamber, an inlet port through the body and communicating with the chamber and an outlet port through the body and communicating with the chamber, the body having a center axis and the inlet port and the outlet port being on opposite sides of the chamber and being at a common radial distance from the center axis, the inlet port and the outlet port being aligned with one another;
- a rotor;
- means mounting the rotor within the chamber between the inlet port and the outlet port for rotation about the center axis of the body;
- a plurality of metering orifices through the rotor at said radial distance from the center axis; and
- means for selectively rotating the rotor so that each of the metering orifices may be selectively aligned with the inlet port and the outlet port.

Preferably, the orifice meter includes transducer ports in fluid connection with the inlet port and the outlet port. Pressure transducers in the transducer ports measure a pressure drop across a metering orifice aligned between the inlet port and the outlet port.

The means for selectively rotating the rotor may comprise a stem nonrotatably engaging the rotor and extending therefrom to outside the body so that turning the stem turns the rotor.

Preferably, the orifice meter includes a plurality of orifice plates mounted within the metering orifices. The orifice plates are mounted within the metering orifices such that the orifice plates are removable. A removable plug on the body may be included for accessing the chamber to replace or service the orifice plates.

The orifice meter may include means for sealing the orifice plates within the metering orifices, such as an O-ring around the orifice plate. The O-ring completely surrounds the exterior of the orifice plate. In this arrangement, a single O-ring is needed to form a seal with the pipes connected to the inlet and outlet ports.

Clearly, the above-described orifice meter represents an improvement over the prior art. Once connected, the pressure transducers measure the pressure at the inlet and outlet ports. The difference in the pressures is then used to calculate the flow rate. However, in the event that the flow rate cannot be determined with these values, the stem extending outside the orifice meter body is used to rotate the metering orifices so that a different orifice plate is aligned with the inlet and outlet ports. At this point, the differential pressure is determined again. If necessary, the plug can be removed for easy access to the orifice plates for service or replacement. Furthermore, all of this is accomplished quickly and easily, without having to stop the flow of the fluid, disconnect the orifice meter, connect the replacement orifice meter and then restart the flow of the fluid. Thus, not only does the above-described invention represent considerable savings in time and effort, there is also virtually no risk of injury to the operator, as the orifice plate can be changed simply by turning the stem extending from the orifice meter body. Furthermore, as the plug allows direct access to the metering orifices and the interior of the orifice meter body, the orifice meter does not have to be disconnected in order to service or replace the orifice plates.

DESCRIPTION OF THE FIGURES

FIG. 1 is an exploded view of the orifice meter.

FIG. 2 is a schematic representation of the orifice meter.

DETAILED DESCRIPTION

In one embodiment, the orifice meter 1 comprises an inlet flange 10, an outlet flange 11, a center assembly 23 and a rotor 28, the details of which are shown in FIG. 1.

The inlet flange 10 and the outlet flange 11 comprise disks of identical size and shape, designated inlet disk 12 and outlet disk 13. Both disks include a transducer port 14 for a pressure transducer 15 arranged within the interior of the disks 12, 13. The details of the pressure transducers 15 are not shown as these will be well-known to one skilled in the art. The disks 12, 13 have a plurality of connecting apertures 16 passing through the entire width of the disk, located at a common radial distance from the center and evenly spaced proximal to the outer edge of the respective disks 12, 13. Additionally, the disks 12, 13 include ports, designated as inlet port 17 and outlet port 18, for connection to a pipe as described below. The ports 17, 18 are at a common radial distance from the center 19, 20 of the respective disks 12, 13 so that the ports 17, 18 are aligned when the orifice meter 1 is assembled as described below. Located within each of the ports 17, 18 is an orifice compression ring 35 for forming a tight seal between the orifice meter 1 and the ends of the pipe as described below. Furthermore, the inlet disk 12 includes a shaft aperture 21 passing through the center 19 of the inlet disk 12 for passing a shaft therethrough as described below. The outlet disk 13 includes an access aperture 22 at the same radial distance from the center 20 of the outlet disk 13 as the outlet port 13. The functions of the shaft aperture 21 and the access aperture 22 do not depend on location, meaning that either or both can be located on the inlet flange 10 or the outlet flange 11 as desired.

The center assembly 23 comprises an open ring 24 having the same diameter as the inlet disk 12 and the outlet disk 13 described above. Furthermore, the open ring 24 has a plurality of connecting apertures 25 passing through the entire width of the open ring 24 shaped and located at the same radial distance from the center 26 of the open ring 24 as the connecting apertures 16 in the disks 12, 13 described above, evenly spaced proximal to the outer edge of the open ring 24. These connecting apertures 16, 25 are involved in the assembly of the orifice meter 1 as described below. The open ring 24 has an inner surface 27 that is arranged for mounting the rotor 28 therewithin as described below.

The rotor 28 comprises a circular plate holder 29 having a center 30 and a shaft 31 connected to the circular plate holder 29 so as to pass through the center 30 of the circular plate holder 29. Of note is that the circular plate holder 29 is of approximately the same diameter as the open area within the open ring 24 such that the rotor 28 can be mounted for rotation within the open ring 24 as described below. The circular plate holder 29 includes a plurality of orifice apertures 32 evenly spaced around the circular plate holder 29 and located at a common radial distance from the center 30 of the circular plate holder 29. Located within each of the orifice apertures 32 is an orifice plate 33 surrounded by an O-ring 34 of a diameter slightly less than the diameter of the orifice apertures 32. Thus, the O-ring 34 forms a seal between the orifice plate 33 and the orifice aperture 32. Of note is that the orifice plates 33 may have openings of various diameters and are removably mounted within the orifice apertures 32.

Assembled, the rotor 28 is mounted into the inner ring 24 of the center assembly 23 such that the outer edge of the circular plate holder 29 engages the inner surface 27 of the open ring 24 so that the rotor 28 is able to rotate freely within the open ring 24. Next, the shaft 31 of the rotor 28 is passed through the shaft aperture 21 until the center assembly 23 and the inlet flange 10 are in direct contact. The outlet flange 11 is then placed into direct contact with the center assembly 23 such that the centers of the inlet disk 19, the center assembly 26 and the outlet disk 20 are aligned, forming an orifice meter 1 with a center axis. Of note is that the end of the shaft 31 that is not connected to the circular plate holder 29 extends outward from the orifice meter 1 so that the rotor 28 within the orifice meter 1 can be rotated from the exterior of the orifice meter 1 by turning the shaft 31. Because the ports 17, 18 and the orifice apertures 32 are located at a common radial distance from their respective centers and the centers are aligned, it is possible to align the ports 17, 18 with one another and with one of the orifice apertures 32. At this point, the orifice compression rings 35 within the inlet port 17 and the outlet port 18 each interact with one side of the O-ring 34, thereby forming a tight seal. Similarly, the connecting apertures 16 in the inlet flange 10 and the outlet flange 11 and the connecting apertures 25 in the center assembly 23 are aligned and bolts are passed therethrough. The access aperture 22 is at the same radial distance from the center axis as the orifice apertures 32 and is positioned so that it is aligned with one of the orifice apertures not aligned with the ports 17, 18. Thus, the orifice plates 33 and O-rings 34 can be serviced or replaced from the access aperture 22 without the need to disconnect the orifice meter 1. A removable plug 36 including seals and sized and shaped to conform with the size and shape of the access aperture 22 is fastened into the access aperture 22 with cap screws, thereby sealing the access aperture 22. Finally, a selector disk 37 is placed over the end of the shaft 31 that extends from the orifice meter 1, and a disk or a collar is fastened to the shaft 31, thereby locking the shaft 31 into place. The selector disk 37 includes numbered positions arranged on its surface that correspond to the positions of the orifice apertures 32 on the circular plate holder 29 of the rotor 28 so that turning the shaft 31 from outside the orifice meter 1 to a numbered position on the surface of the selector disk 37 brings the corresponding orifice aperture 32 into alignment with the ports 17, 18.

In operation, the ports 17, 18 of the orifice meter 1 are connected to a pipe 38 as shown in FIG. 2. The shaft 31 is turned to the desired position on the selector disk 37 so that the circular plate holder 29 of the rotor 28 rotates to bring the desired orifice plate 33 into alignment with the ports 17, 18 so that a fluid can flow therethrough. The fluid flows down the pipe 38 and into the inlet port 17. At this point, the pressure is measured by the pressure transducer 15 in the transducer port 14 of the inlet flange 10. The fluid then flows through the orifice aperture 32 and the flow is constricted by the selected orifice plate 33. This causes an increase in the kinetic energy of the flow and a decrease in pressure. Next, the fluid passes into the outlet port 18 where the pressure is measured by the pressure transducer 15 at the transducer port 14 of the outlet flange 11. The difference in pressure in the inlet flange 10 and the outlet flange 11 is used to determine the rate of flow. If necessary, a different orifice plate 33 can be rotated into alignment with the inlet port 17 and the outlet port 18 and the rate of flow measured again without disconnecting the orifice meter 1. If desired, the removable plug 36 can be removed and the orifice plate 33 in the circular plate holder 29 aligned with the access aperture 22 can be replaced without disconnecting the orifice meter 1. Thus, the above-described invention makes it possible to change or even replace orifice plates 33 quickly and easily without having to loosen any part of the fitting or disconnect the orifice meter 1.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An orifice meter comprising:

a body comprising a first plate, a second plate parallel to the first plate, a peripheral side wall extending from the first plate to the second plate to enclose an internal chamber, an inlet port through the first plate and communicating with the chamber and an outlet port through the second plate and communicating with the chamber, the body having a centre axis and the inlet port and the outlet port being on opposite sides of the chamber and being at a common radial distance from the centre axis, the inlet port and the outlet port being aligned with one another;

a rotor enclosed completely in the chamber such that the rotor is completely enclosed within the body between the inlet port and the outlet port;

means mounting the rotor within the chamber for rotation about the center axis of the body;

a plurality of metering orifices through the rotor at said radial distance from the center axis;

means for selectively rotating the rotor so that each of the metering orifices can be selectively aligned with the inlet port and the outlet port;

a removable plug on the body for accessing the chamber to replace or service the orifice plates;

transducer ports in fluid connection with the inlet port and the outlet port; and pressure transducers in the transducer ports for measuring a pressure drop across a metering orifice aligned between the inlet port and the outlet port.

2. The orifice meter according to claim 1 wherein the means for selectively rotating the rotor comprises a stem non-rotatably engaging the rotor and extending therefrom to outside the body so that turning the stem turns the rotor.

3. An orifice meter comprising:

a body comprising a first plate, a second plate parallel to the first plate, a peripheral side wall extending from the first plate to the second plate to enclose an internal chamber, an inlet port through the first plate and communicating with the chamber and an outlet port through the second plate and communicating with the chamber, the body having a centre axis and the inlet port and the outlet port being on opposite sides of the chamber and being at a common radial distance from the centre axis, the inlet port and the outlet port being aligned with one another;

a rotor enclosed completely in the chamber such that the rotor is completely enclosed within the body between the inlet port and the outlet port;

means mounting the rotor within the chamber for rotation about the center axis of the body;

a plurality of metering orifices through the rotor at said radial distance from the center axis;

means for selectively rotating the rotor so that each of the metering orifices can be selectively aligned with the inlet port and the outlet port;

an access aperture on a side of the body at said radial distance from the centre axis for removing metering orifices without removing the rotor from the body; and a removable plug arranged to be fitted into the access aperture for sealing the body.

4. The orifice meter according to claim 3 including transducer ports in fluid connection with the inlet port and the outlet port.

5. The orifice meter according to claim 4 including pressure transducers in the transducer ports for measuring a pressure drop across a metering orifice aligned between the inlet port and the outlet port.

6. The orifice meter according to claim 3 wherein the means for selectively rotating the rotor comprises a stem non-rotatably engaging the rotor and extending therefrom to outside the body so that turning the stem turns the rotor.

7. An orifice meter comprising:

a body comprising a first plate, a second plate parallel to the first plate, a peripheral side wall extending from the first plate to the second plate to enclose an internal chamber, an inlet port through the first plate and communicating with the chamber and an outlet port through the second plate and communicating with the chamber, the body having a centre axis and the inlet port and the outlet port being on opposite sides of the chamber and being at a common radial distance from the centre axis, the inlet port and the outlet port being aligned with one another;

a rotor enclosed completely in the chamber such that the rotor is completely enclosed within the body between the inlet port and the outlet port;

means mounting the rotor within the chamber for rotation about the center axis of the body;

a plurality of metering orifices through the rotor at said radial distance from the center axis;

means for selectively rotating the rotor so that each of the metering orifices can be selectively aligned with the inlet port and the outlet port;

a removable plug on the body for accessing the chamber to replace or service the orifice plates;

an inlet orifice compression ring mounted on the first plate around the inlet port for forming a tight seal between the inlet port and the rotor; and an outlet orifice compression ring mounted on the second plate around the outlet port for forming a tight seal between the outlet port and the rotor.

8. The orifice meter according to claim 7 including transducer ports in fluid connection with the inlet port and the outlet port.

9. The orifice meter according to claim 8 including pressure transducers in the transducer ports for measuring a pressure drop across a metering orifice aligned between the inlet port and the outlet port.

10. The orifice meter according to claim 7 wherein the means for selectively rotating the rotor comprises a stem non-rotatably engaging the rotor and extending therefrom to outside the body so that turning the stem turns the rotor.

* * * * *